(12) United States Patent
Raguet et al.

(10) Patent No.: US 7,957,419 B2
(45) Date of Patent: Jun. 7, 2011

(54) METHOD FOR THE MANAGEMENT OF BANDWIDTH IN A COMMUNICATIONS NETWORK, CORRESPONDING COMPUTER-READABLE STORAGE MEDIUM AND DEVICES

(75) Inventors: Emmanuel Raguet, Le Rheu (FR); Arnaud Closset, Cesson Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 12/243,892

(22) Filed: Oct. 1, 2008

(65) Prior Publication Data
US 2009/0092151 A1 Apr. 9, 2009

(30) Foreign Application Priority Data
Oct. 5, 2007 (FR) ..................... 07 58116

(51) Int. Cl.
*H04L 29/06* (2006.01)
(52) U.S. Cl. ...................................... 370/468
(58) Field of Classification Search .......... 370/329–330, 370/341, 345, 347–348, 431, 437, 442, 458, 370/468
See application file for complete search history.

(56) References Cited

U.S. PATENT DOCUMENTS
6,324,184 B1 * 11/2001 Hou et al. ..................... 370/468
7,177,307 B2 2/2007 Frouin et al.
2006/0259266 A1 11/2006 Bizet et al.

FOREIGN PATENT DOCUMENTS
WO 2005-006112 1/2005

OTHER PUBLICATIONS
U.S. Appl. No. 12/351,248, filed Jan. 9, 2009, Closset, et al.
U.S. Appl. No. 12/351,278, filed Jan. 9, 2009, Closset, et al.

* cited by examiner

*Primary Examiner* — Frank Duong
(74) *Attorney, Agent, or Firm* — Fitzpatrick, Cella, Harper & Scinto

(57) ABSTRACT

A method for managing bandwidth in a synchronous communications network including a plurality of nodes, the network implementing a first clocking which defines a data-processing cycle including a determined number of virtual channels, the data-processing cycle being defined by a current data-processing frequency, the plurality of nodes including at least one transmitter node associated with at least one generator application, each generator application being associated with at least one virtual channel for transmitting its data, the virtual channel or channels associated with a given generator application being filled one by one from the first to a last virtual channel. Such a method includes the following steps performed for a given generator application: determining a rate of use of the last virtual channel of the set of virtual channels; adjusting the current data-processing frequency; and allocating an integer number of virtual channels.

20 Claims, 8 Drawing Sheets

| If the decimal part of $VC_{theoretical}$ is.. | The last reserved virtual channel is full every... |
|---|---|
| 0.999 | 1 cycle SDPC |
| 0.500 | 2 cycles SDPC |
| 0.333 | 3 cycles SDPC |
| 0.250 | 4 cycles SDPC |
| 0.200 | 5 cycles SDPC |
| 0.100 | 10 cycles SDPC |
| 0.050 | 20 cycles SDPC |
| 0.010 | 100 cycles SDPC |
| 0.001 | 1000 cycles SDPC |
| 0.0001 | 10000 cycles SDPC |

Figure 4

METHOD FOR THE MANAGEMENT OF BANDWIDTH IN A COMMUNICATIONS NETWORK, CORRESPONDING COMPUTER-READABLE STORAGE MEDIUM AND DEVICES

FIELD OF THE INVENTION

The field of the invention is that of the transmission of data contents in a synchronous communications network.

The invention relates especially but not exclusively to the transmission of data contents in a synchronous wireless home communications network comprising a plurality of nodes.

It can be applied for example to 60 GHz radio transmission systems. These 60 GHz radio transmission systems are particularly well suited to short-distance high-bit-rate data transmission.

In such communications networks, it is necessary to be able to support one or more concurrent applications (audio or audiovisual applications for example) simultaneously.

TECHNOLOGICAL BACKGROUND

In synchronous type communications networks and more particularly TDM (Time division multiplex) type networks, a multiplexing technique is used to enable a transmitter to transmit data from one or more channels working at a certain bit rate in a transmission channel of a higher bit rate associated with a communications network.

The bandwidth available in the transmission channel associated with a communications network is subdivided into several synchronous virtual channels or VCs corresponding to time slots.

Each virtual channel corresponds to a set of bits (also called a sample here below) used by a transmitter to transmit data. A transmitter can use a set of virtual channels.

A full synchronous data-processing cycle (SDPC) is formed by all the samples of each of the virtual channels available on the communications network. The SPDC cycle is characterized by the frequency at which a transmitter can write to a same virtual channel. The SPDC cycle possesses a finite number of virtual channels. It is therefore necessary to optimize its use in order to increase the useful bit rate of this synchronous network.

In a first classic technique, a device manages the total bandwidth of the transmission channel associated with the network in distributing a set of virtual channels among the different transmitters of the network. A transmitter may, for example, make a request to this device, indicating its needs in terms of resources, and the device will reserve a number of virtual channels for it accordingly.

However, one drawback of this prior art technique is that a transmitter of the network can ask for more resources than it really needs. There is therefore a loss of bandwidth, with certain sources reserved for a given application remaining unused throughout the time when this application is being implemented. This is especially true when the granularity of reservation of the resource is greater than the granularity of the data transmitted by a transmitter of the network or when the granularity of reservation of the resources greater than the quantity of data sent out by a transmitter of the network in a transmission cycle: for example, when the system permits blockwise reservation of N*X bits per transmission cycle and when the transmitter node sends a maximum of M words of X bits per transmission cycle, with M<N.

To make the management of the bandwidth of the transmission channel more efficient and thus improve the performance of the communications synchronous network, a second prior art technique, described in the patent document WO2005/006112, presents a MAC (media access controller) protocol implementation in a TDMA (time-division multiple access) type network having a master node and several slave nodes. This second known technique manages the time slots of the frame dynamically, in creating time slots with a granularity of one bit. When a transmitter sends a request to the master node, the master node allocates a set of one-bit time slots to the transmitter, thus enabling the most efficient use of the total bandwidth of the network. To manage these sets of time slots efficiently, a header, are designated as a "sync slot" is used for each of the sets so that a receiver can get synchronized with the appropriate set.

However, one drawback of this second prior art technique relies on the addition of a header which uses a part of the useful bandwidth. Thus, when the number of concurrent applications implemented within the network is great, the loss of resources is high.

Besides, another drawback of this second prior art technique is that, when an application requires only few resources, the size of the header is disproportionate to the rest of the data to be transmitted.

AIMS OF THE INVENTION

The invention, in at least one embodiment, is aimed especially at overcoming these drawbacks of the prior art.

More specifically, it is an aim of the invention, in at least one of its embodiment, to provide a technique for optimizing the use of the bandwidth available in the transmission channel associated with a synchronous communications network.

It is another aim of the invention, in at least one of its embodiments, to implement a technique of this kind for optimizing the resources allocated to the different concurrent applications broadcast on the synchronous communications network.

It is yet another aim of the invention, in at least one of its embodiments, to provide a technique of this kind to augment the number of concurrent transmitter applications capable of using the network.

It is another goal of the invention to provide a technique of this kind without implementing additional signaling operations within the data (such as for example specific headers) transmitted by the concurrent transmitter applications.

It is another aim of the invention to provide a technique of this kind without degradation in the conditions of broadcasting the transmitter applications on the communications network.

Yet another aim of the invention, in at least one of its embodiments, is to implement a technique of this kind that can be implemented simply and at low cost.

SUMMARY OF THE INVENTION

One particular embodiment of the invention proposes a method of managing bandwidth in a synchronous communications network comprising a plurality of nodes, said network implementing a first clocking which defines a data-processing cycle comprising a determined number of virtual channels corresponding to time slots, said data-processing cycle being defined by a current data-processing frequency, said plurality of nodes comprising at least one transmitter node associated with at least one generator application generating data that has to be transmitted to at least one receiver node, each generator application being associated with at least one virtual channel to transmit its data, said virtual channel or channels associated with a given generator application being filled one by one from a first to a last virtual channel.

According to the invention, a method of this kind comprises the following steps, performed for a given generator application:

a) determining a set of virtual channels for transmitting the data of the given generator application according to the first clocking defined by the current data-processing frequency;

b) determining a rate of use of the last virtual channel of the set of virtual channels determined for transmitting the data of said generator application;

c) adjusting said current data-processing frequency, as a function of said the rate of use of said last virtual channel, enabling an adjusted data processing frequency to be obtained; and d) allocating an integer number of virtual channels for transmitting the data of said generator application, as a function of said rate of use of said last virtual channel.

The general principle of the invention consists in modifying the data processing frequency (the data-processing cycle) in order to achieve a more efficient use of the bandwidth of the transmission channel associated with the communications network. The adjustment of the data processing frequency then provides for more efficient use of the last virtual channel associated with a generator application and hence an optimizing of the resources needed for the transmission of the data of the application.

The invention thus optimizes the use of the bandwidth available on the transmission channel associated with the synchronous communications network, and even increases the number of concurrent transmitter applications capable of using the network.

Advantageously, the step c) of adjusting said current data-processing frequency comprises the following steps:

c1) determining an optimal decimal number of virtual channels as a function of said rate of use of the last virtual channel;

c2) determining said adjusted data-processing frequency, as a function of said optimal decimal number of virtual channels;

c3) applying said adjusted data-processing frequency;
and the step d) of assigning an integer number of virtual channels comprises a step of determining said integer number of virtual channels, as a function of said optimal decimal number of virtual channels.

Thus, this approach makes it possible to release (or not allocate at an initial stage) a virtual channel that is under-utilized for the transmission of data of a generator application, making it possible especially to place this virtual channel at the disposal of the other generator applications in the case of multiple generator applications.

According to an advantageous characteristic of the invention, the method is such that:

if a current integer number of virtual channels has not been allocated for transmitting the data of said generator application, then said integer number of virtual channels is allocated for transmitting of the data of said given generator application;

if a current integer number of virtual channels has already been allocated for transmitting the data of said generator application, then one of said allocated virtual channels is released for transmission of the data of said generator application.

Preferably, said last virtual channel of the set of determined virtual channels for transmitting the data of said generator application according to the first clocking is excluded from the virtual channels allocated for transmitting the data of said generator application in the allocating step d).

Thus, the exclusion of the last virtual channel for transmitting the data of the generator application especially enables this virtual channel to be made available to the other generator applications in the case of multiple generator applications. This makes it possible especially, should a set of virtual channels have been allocated to the generator application and should the generator application use these allocated virtual channels to transmit these pieces of data, to release the virtual channel which by default will not be used at each cycle, once the current data-processing frequency has been adjusted.

Advantageously, said step a) of determining a set of virtual channels for transmitting the data of the generator application comprises the following step:

determining a theoretical decimal number of virtual channels as a function of:
said current data-processing frequency;
a precise value of the current data-processing frequency;
a size of each of said virtual channels;
a frequency at which said generator application generates data samples;
a precise value of the frequency at which said generator application generates data samples;
a size of each of said data samples.

Thus, it is possible to determine a set of virtual channels necessary for transmitting the data of said generator application without having to set of communication between generator application and consumer application or applications, and then to monitor the rate of filling of the last virtual channel allocated to this communication.

Advantageously, said step of determining a rate of use of the last virtual channel for said generator application comprises the following step:

determining said rate of use of the last virtual channel, as a function of said theoretical decimal number of virtual channels, said rate of use being a theoretical rate of use.

Thus, the rate of use of the last virtual channel corresponds to a theoretical rate of use coming from the determining of a theoretical decimal number of virtual channels.

Advantageously, said step of determining an optimal decimal number of virtual channels comprises the following steps:

comparing said theoretical rate of use with a predetermined threshold;

if said theoretical rate of use is greater than said threshold, said optimal decimal number of virtual channels is taken to be equal to said theoretical decimal number of virtual channels;

if said theoretical rate of use is lower than or equal to said threshold, said optimal decimal number of virtual channels is taken to be smaller than or equal to the integer part of said theoretical decimal number of virtual channels Thus, the comparing step is used to determine whether the theoretical rate of use is optimal or not optimal, by comparing it with a threshold. Should the rate of use be below the threshold, it is not optimal and an adjustment of data-processing frequency may be set up without causing degradation of the characteristics of the communications network in a detrimental way.

According to an advantageous characteristic, if said theoretical rate of use is lower than or equal to said threshold, said optimal decimal number of virtual channels is furthermore taken to be greater than the integer part of said theoretical decimal number of virtual channels decreased by one unit and increased by said threshold.

According to an advantageous variant of the invention, with a current integer number of virtual channels being already allocated for transmitting the data of said generator application, said step of determining a rate of use of the last virtual channel for said generator application comprises a step of measuring a real rate of use of said last virtual channel of the set of determined virtual channels for transmitting the data of said generator application.

Thus, according to the advantageous variant of the invention, the rate of use of the last virtual channel corresponds to a real rate of use, enabling an optimizing of the resources as a function of real data and not theoretical data. This makes it possible to determine a set of virtual channels necessary for transmitting the data of said generator application without having a priori knowledge of the precise values and frequencies associated with the data-processing and the generator application.

According to an advantageous characteristic of the advantageous variant, said step of determining an optimal decimal number of virtual channels comprises the following steps:

comparing said real rate of use with a determined threshold; and if said real rate of use is lower than or equal to said threshold, said decimal optimal number of virtual channels is taken to be smaller than or equal to the current integer number of virtual channels already allocated to said generator application decreased by one unit.

Thus, the comparing step is used to determine whether the real rate of use is optimal or not, by comparing it with a threshold. Should the real rates of use be lower than the threshold, it is not optimal and an adjustment of the data-processing frequency may be set up without harmfully downgrading the characteristics of the communications network.

Advantageously, according to the advantageous variant, if said real rate of use is lower than or equal to said threshold, said optimal decimal number of virtual channels is furthermore taken to be greater than the current integer number of virtual channels already allocated to said generator application, decreased by two units and increased by said threshold.

Advantageously, when said step of adjusting said current data-processing frequency has been performed during a current data-processing cycle, said allocating step is implemented when the rate of use of said last virtual channel is null during a predetermined time period after an adjusted data-processing frequency has been obtained.

Thus, there is no loss of applications data on the release of the virtual channel after adjustment of the data-processing frequency.

Thus, it is ensured that the last virtual channel is no longer used.

According to an advantageous characteristic, said network implementing a second clocking which defines a data-transmission cycle corresponding to an integer number of data-processing cycles, a data-transmission cycle comprising a synchronization interval between the last transmission of data in said data-transmission cycle and the end of said data-transmission cycle, and said step c2) is followed by the following steps:

c2') determining a new value of said synchronization interval, in taking account of said adjusted data-processing frequency;

c2") comparing said new value of said synchronization interval with a determined minimum value;

and if said new value of said synchronization interval is greater than or equal to said determined minimum value, then the operation passes to the said step c3);

if not, the operation returns to the step c1) in order to determine a new optimal decimal number greater than the preceding optimal decimal number.

Thus, the verification of the value of the synchronization interval ensures that the adjustment of the data-processing frequency does not lower the quality of the overall functioning of the communications network.

Advantageously, should at least two generator applications be present in the communications network, said step b) of determining a rate of use of the last virtual channel is performed for each generator application, and said method comprises a step of selecting the generator application having the lowest rate of use of the last virtual channel, and said steps c) and d) are performed for the selected generator application.

Thus, in the case of multiple generator applications, the optimizing of the use of the bandwidth is done on the generator application for which the rate of use of the last virtual channel has the lowest value.

Advantageously, the method comprises the following steps:

analyzing the impact of said adjusted data-processing frequency on the rate of use of the last virtual channel for each of the generator applications other than the selected generator application;

in the event of detecting a degradation of the rate of use of the last virtual channel for at least one of the other generator applications, called at least one degraded application:

at least one part of said steps c) and d) is reiterated for the selected generator application; and/or at least one part of said steps c) and d) is reiterated for said degraded application or applications.

Thus, in the case of multiple generator applications, it is ascertained that the optimizing of the generator application does not downgrade the operation of the other generator applications (in terms of reduction of the rate of use of the last virtual channel, the need for an additional virtual channel etc).

The invention also concerns a computer-readable storage medium storing a computer program, which computer program comprises a set of instructions that, when executed by a computer, implement the management method as described here above.

The invention also concerns a device for managing bandwidth in a synchronous communications network comprising a plurality of nodes, said network implementing a first clocking which defines a data-processing cycle comprising a determined number of virtual channels corresponding to time slots, said data-processing cycle being defined by a current data-processing frequency, said plurality of nodes comprising at least one transmitter node associated with at least one generator application generating data that has to be transmitted to at least one receiver node, each generator application having to be associated with at least one virtual channel for transmitting its data, said virtual channel or channels associated with a given generator application being filled one by one from a first to a last virtual channel.

According to the invention, a device of this kind comprises the following means, applied for a given generator application:

e) means for determining a set of virtual channels for transmitting the data of the given generator application according to the first clocking defined by the current data-processing frequency;

f) means for determining a rate of use of the last virtual channel of the set of virtual channels determined for transmitting the data of said generator application;

g) means for adjusting said current data-processing frequency, as a function of said the rate of use of said last virtual channel, enabling an adjusted data-processing frequency to be obtained; and h) means for allocating an integer number of virtual channels for transmitting of the data of said generator application, as a function of said rate of use of said last virtual channel.

Advantageously, the means g) for adjusting of said current data-processing frequency comprise the following steps:

g1) means for determining an optimal decimal number of virtual channels as a function of said rate of use of the last virtual channel;

g2) means for determining said adjusted data-processing frequency, as a function of said optimal decimal number of virtual channels;

g3) means for applying said adjusted data-processing frequency;

and the means h) for allocating an integer number of virtual channels comprise means for determining said integer number of virtual channels, as a function of said optimal decimal number of virtual channels.

Preferably, said device comprises the following means:

means for allocating of said integer number of virtual channels for transmitting the data of said given generator application if a current integer number of virtual channels has not already been allocated for transmitting the data of said generator application;

means for releasing one of said virtual channels allocated for transmitting the data of said generator application, said releasing means being activated if a current integer number of virtual channels has already been allocated for transmitting the data of said generator application.

Advantageously, said last virtual channel of the set of determined virtual channels for transmitting the data of said generator application according to the first clocking is excluded from the virtual channels allocated for transmitting the data of said generator application by the allocating means h).

Preferably, said means e) for determining a set of virtual channels for transmitting the data of the generator application comprise the following means:

means for determining a theoretical decimal number of virtual channels as a function of:
  said current data-processing frequency;
  a precise value of the current data-processing frequency;
  a size of each of said virtual channels;
  a frequency at which said generator application generates data samples;
  a precise value of the frequency at which said generator application generates data samples;
  a size of said data samples.

According to an advantageous characteristic of the invention, said means for determining a rate of use of the last virtual channel for said generator application comprise the following means:

means for determining said rate of use of the last virtual channel, as a function of said theoretical decimal number of virtual channels, said rate of use being a theoretical rate of use.

According to a preferred characteristic of the invention, said means for determining an optimal decimal number of virtual channels comprise means for implementing the following first allocation mechanism:

comparing said theoretical rate of use with a predetermined threshold;

if said theoretical rate of use is greater than said threshold, said optimal decimal number of virtual channels is taken to be equal to said theoretical decimal number of virtual channels;

if said theoretical rate of use is lower than or equal to said threshold, said optimal decimal number of virtual channels is taken to be smaller than or equal to the integer part of said theoretical decimal number of virtual channels Advantageously, said first allocation mechanism is such that, if said theoretical rate of use is lower than or equal to said threshold, said optimal decimal number of virtual channels is furthermore taken to be greater than the integer part of said theoretical decimal number of virtual channels diminished by one unit and increased by said threshold.

Preferably, according to an advantageous variant of the invention, a current integer number of virtual channels being already allocated for transmitting the data of said generator application, said means for determining a rate of use of the last virtual channel for said generator application comprise means for measuring a real rate of use of said last virtual channel of the set of determined virtual channels for transmitting the data of said generator application.

Advantageously, according to the advantageous variant of the invention, said means for determining an optimal decimal number of virtual channels comprise means for implementing the following second allocation mechanism:

comparing said real rate of use with a determined threshold;

if said real rate of use is lower than or equal to said threshold, said decimal optimal number of virtual channels is taken to be smaller than or equal to the current integer number of virtual channels already allocated for transmitting the data of said generator application diminished by one unit.

Preferably, according to the advantageous variant of the invention, said second allocation mechanism is such that, if said real rate of use is lower than or equal to said threshold, said optimal decimal number of virtual channels is furthermore taken to be greater than the current integer number of virtual channels already allocated for transmitting the data of said generator application, decreased by two units and increased by said threshold.

According to an advantageous characteristic of the advantageous variant, when the means for adjusting said current data-processing frequency have been activated during a current data-processing cycle, said allocating means are activated when the rate of use of said last virtual channel is null during a predetermined time period after an adjusted data-processing frequency has been obtained.

Advantageously, said network implementing a second clocking that defines a data-transmission cycle corresponding to an integer number of data-processing cycles, a data-transmission cycle comprising a synchronization interval between the last transmission of data of said data-transmission cycle and the end of said data-transmission cycle, said adjusting means g2) furthermore comprise the following means:

g2') means for determining a new value of said synchronization interval, in taking account of said adjusted data-processing frequency;

g2") means for comparing said new value of said synchronization interval with a determined minimum value; and g2''') means for activating such that:
  if said new value of said synchronization interval is greater than or equal to said determined minimum value, then the means g3) for applying said data-processing frequency are activated;

if not, the means g1) for determining a new optimal decimal number of virtual channels are activated in order to determine a new optimal decimal number greater than the preceding optimal decimal number.

Preferably, should at least two generator applications be present in the communications network, said means b) for determining a rate of use of the last virtual channel are activated for each generator application,
and said device comprises means for selecting the generator application having the lowest rate of use of the last virtual channel,
and said means g) and h) are activated for the selected generator application.

Advantageously, said device comprises the following means:
means for analyzing the impact of said adjusted data-processing frequency on the rate of use of the last virtual channel for each of the generator applications other than the selected generator application;
means for detecting a degradation of the rate of use of the last virtual channel for at least one of said other generator applications, called at least one degraded application;
means for activating enabling the following if a degradation is detected by said detecting means:
    a new activation of at least one of said means g) and h) for the selected generator application; and/or
    an activation of at least one of said means g) and h) for said degraded application or applications.

LIST OF FIGURES

Other features and advantages of the invention shall appear more clearly from the following description of a particular embodiment, given by way of a simple illustrative and non-restrictive example, and from the appended drawings, of which:

Figure 3A:
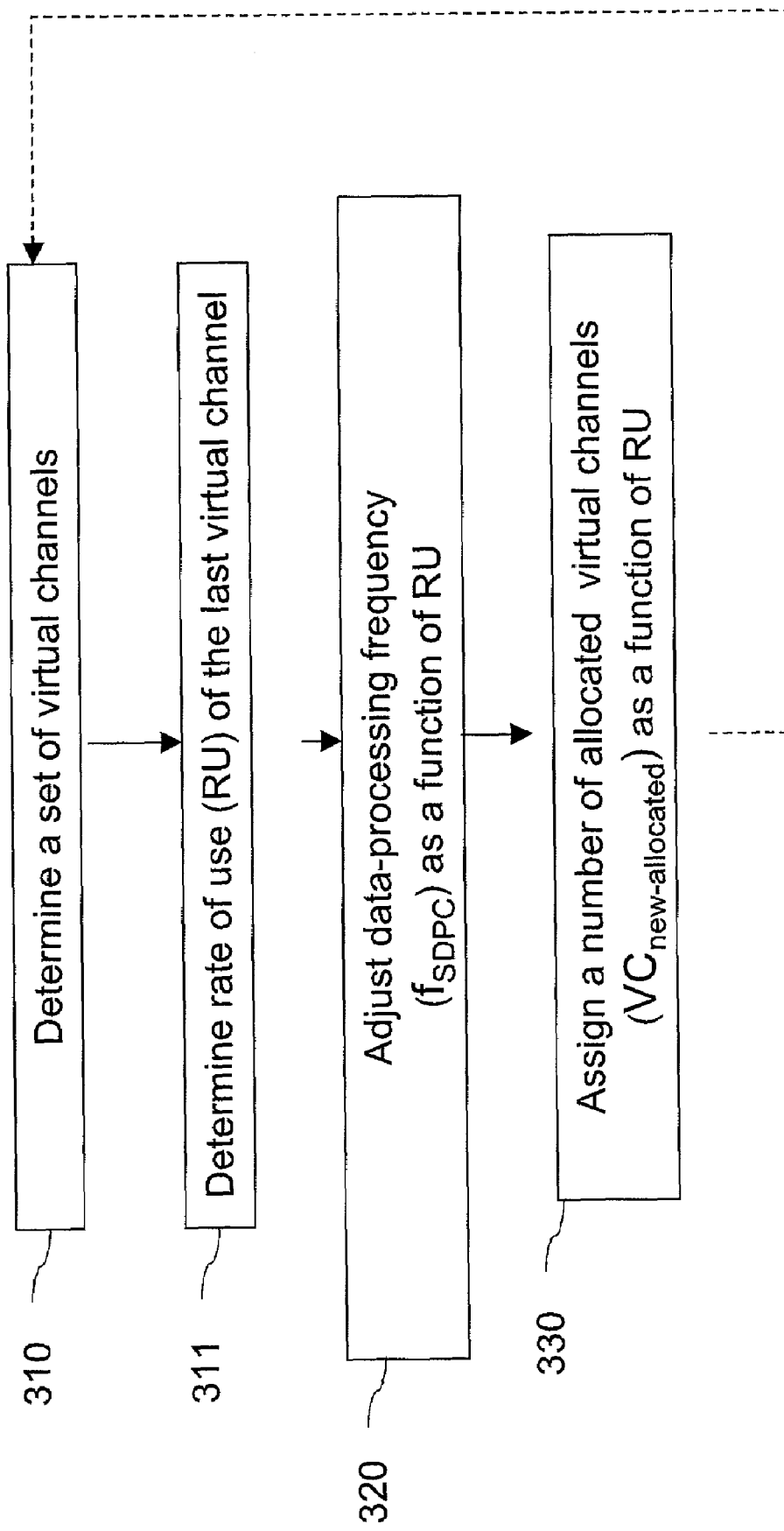
Figure 3B:
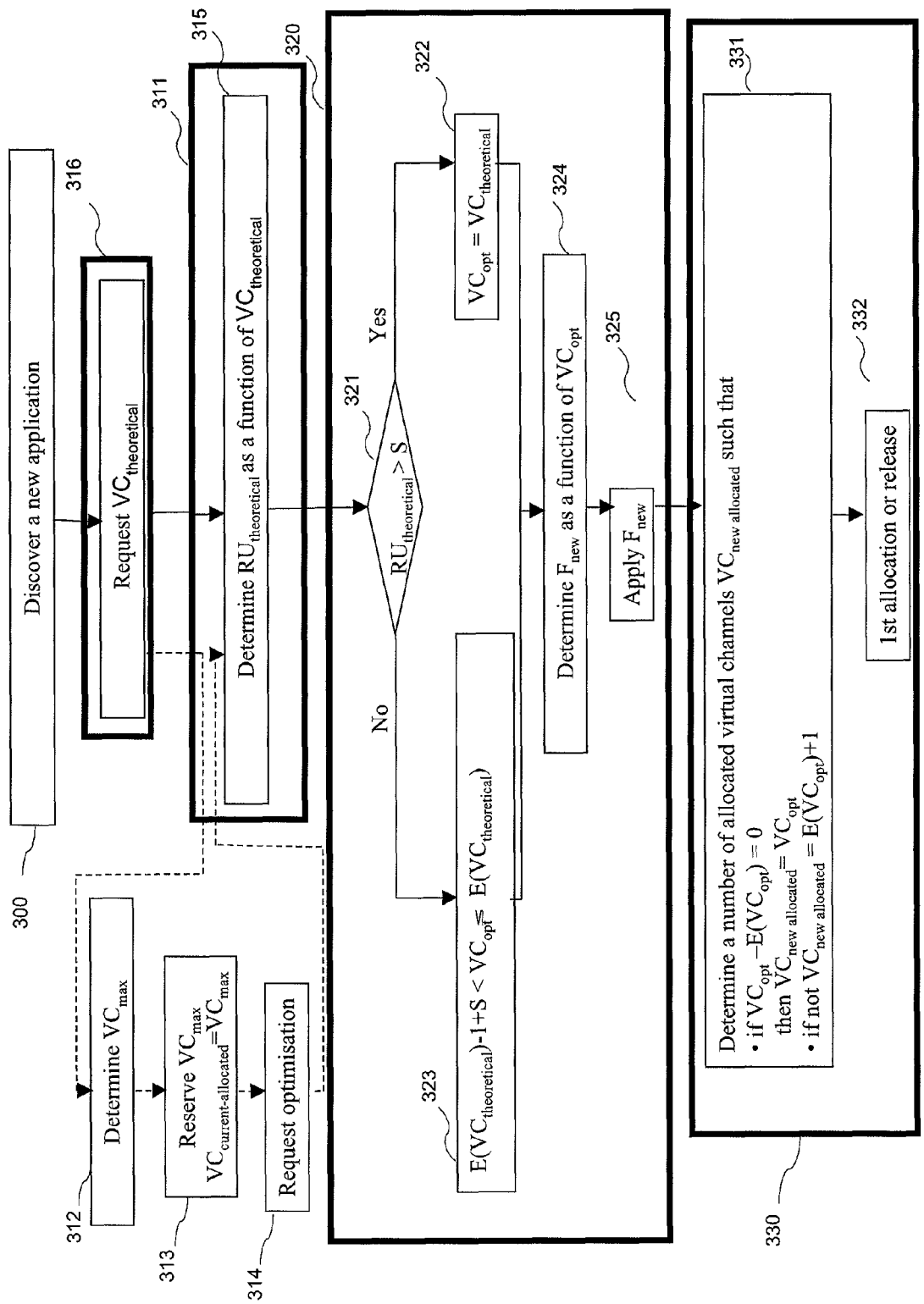
Figure 5:
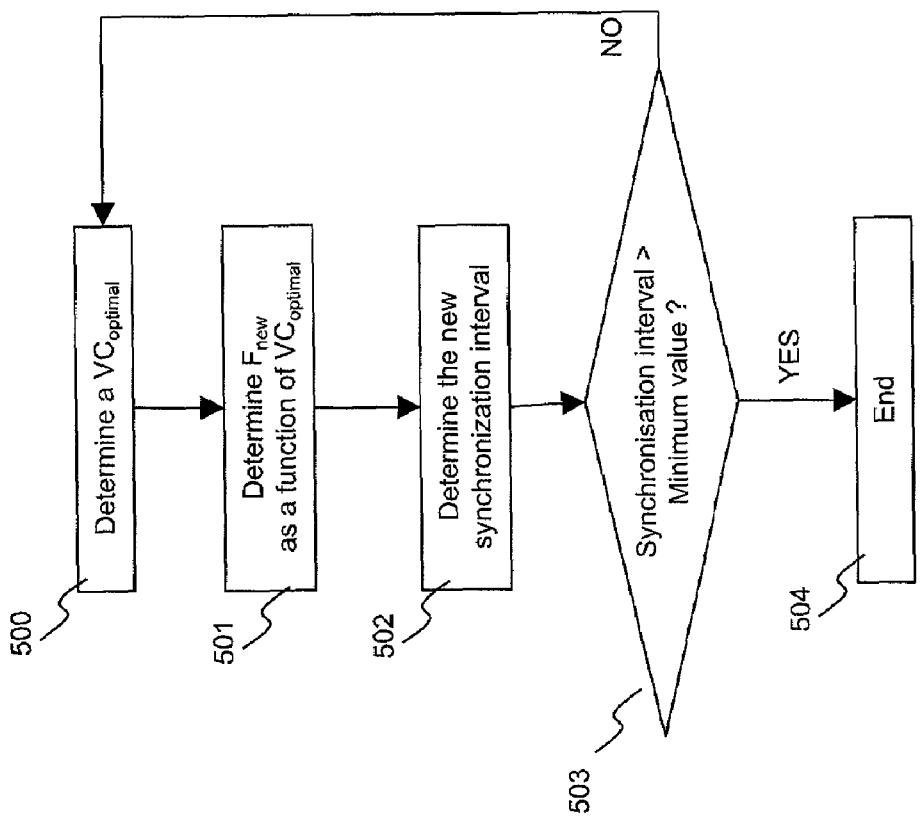
Figure 6:
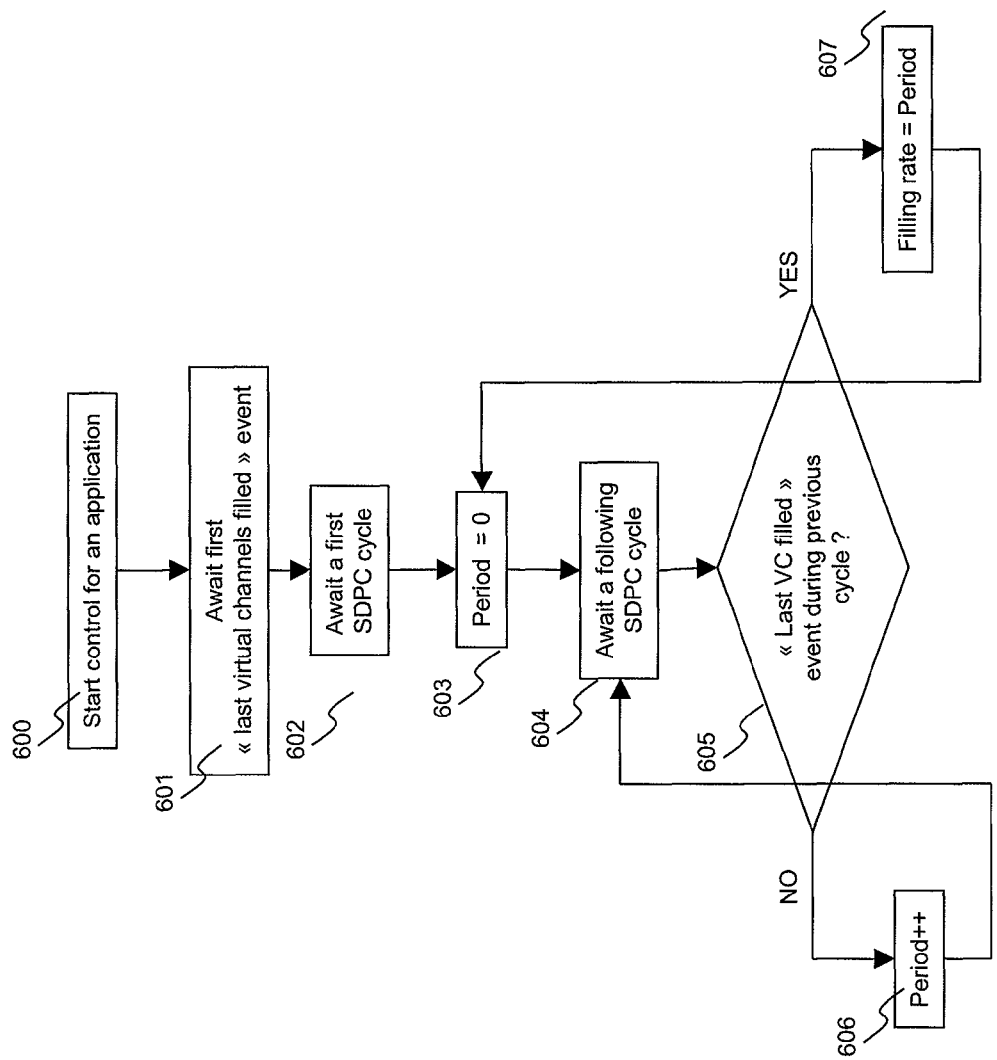
Figure 7:
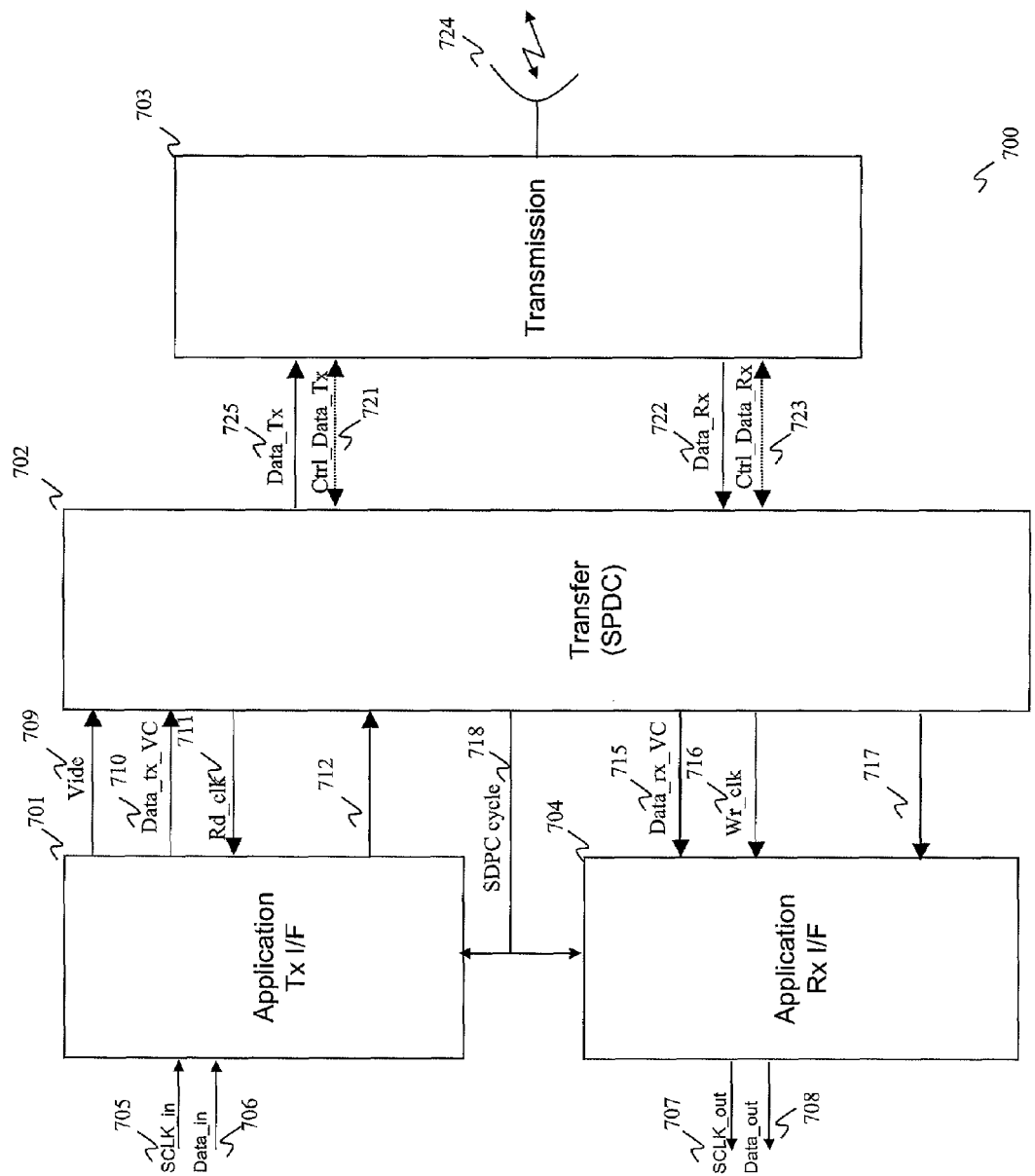

FIG. 3A presents the main steps of an algorithm for the management of the bandwidth implemented within a management device according to the particular embodiment of the invention;

FIG. 3B is a detailed view of the steps of the bandwidth management algorithm of FIG. 3A according to the particular embodiment of the invention;

FIG. 4 is a table grouping together a set of rates of use of the last virtual channel allocated to a generator application according to the particular embodiment of the invention;

FIG. 5 presents the main steps of an algorithm for determining the value of a synchronization interval according to the embodiment of the invention;

FIG. 6 describes the main steps of a monitoring algorithm for monitoring the rate of use of the last reserved virtual channel according to a variant of the particular embodiment of the invention;

FIG. 7 illustrates an example of a generic architecture of a communications node of the communications network implementing the bandwidth management method according to a particular embodiment of the invention.

DETAILED DESCRIPTION

By way of an illustrative example, the invention is situated here below in the context of a wireless communications network on which the audio contents are transmitted.

Naturally, the invention can also be applied in the context of a wireless communications network in which the audiovisual contents are transmitted or even in any other communications network.

The transmission channel is clocked according to a transmission cycle called an SDTC (described here below). The SDTC transmission cycle corresponds to a fixed number of synchronous data-processing cycles or SDPC (described here below). The bandwidth available on the transmission channel can therefore be characterized by the quantity of data that can be processed by the transmitter devices of the communications network during a synchronous data-processing cycle or SDPC.

The bandwidth available during a synchronous data-processing cycle or SDPC is subdivided into several synchronous virtual channels or VC corresponding to fixed time slots.

Here below in the description, it shall be considered that each of the generator applications is associated with at least one virtual channel to transmit its data, the virtual channel or channels associated with a generator application being filled one by one from a first virtual channel to a last virtual channel.

According to the particular embodiment of the invention, the wireless communications network comprises N communications nodes. For example, should N=9, the communications network comprises:

eight customer or client nodes (for example one customer node per room of a house when the communications network is installed in a house), also designated as WAR (wireless audio renderer) nodes. Each of the WAR nodes comprises an audio content renderer which possesses especially at least one amplified speaker; and a server node, also called a WAP (Wireless Audio Player) node liable to transmit different audio contents, through the wireless communications network, to the WAR nodes.

One communications node among the N nodes of the network comprises a device for management of the bandwidth of the transmission channel of the communications network.

The bandwidth management method according to the invention (described here below in greater detail with reference to FIGS. 3A and 3B) is implemented in the form of a software program and/or a plurality of software sub-programs (comprising a plurality of algorithms described here below) which is or are executed in one or more machines of the communications network, especially the WAP communications node.

Figure 1:
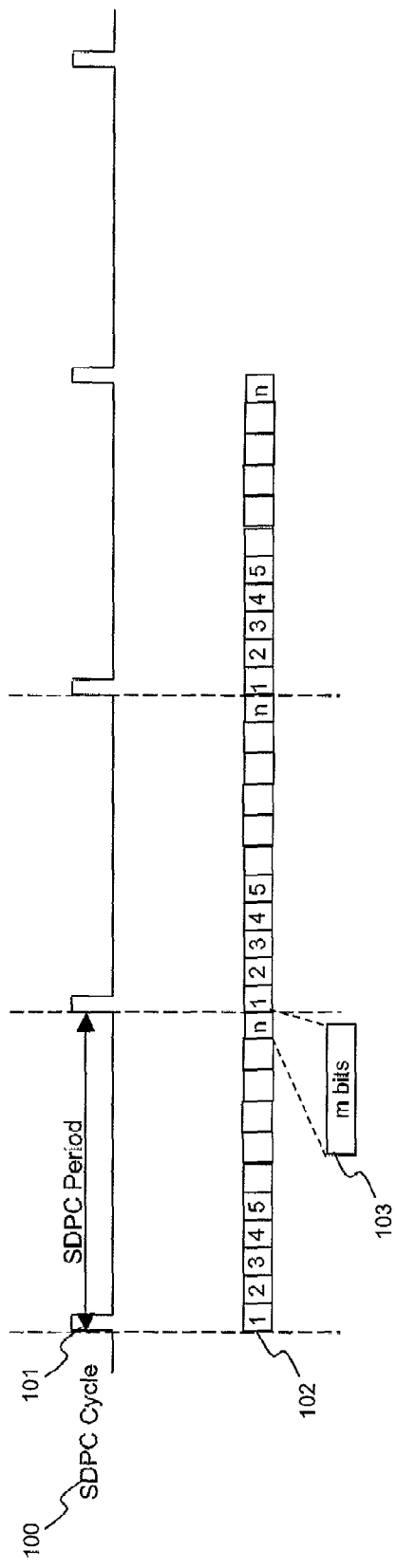
FIG. 1A illustrates a drawing of a synchronous data-processing cycle or SDPC according to the particular embodiment compliant with the invention.
FIG. 1B is a drawing illustrating a full synchronous data transmission cycle or SDTC according to the embodiment of the invention.

FIG. 1A presents a drawing of a synchronous data-processing cycle SDPC according to the particular embodiment of the invention.

The sampling frequency of the virtual channels (for example 8 KHz) as well as the size of the data samples transmitted (for example 48 bits) characterizes the useful bit rate of each virtual channel (referenced 103). Thus, a virtual channel has a constant bit rate of 384 Kbps (kilobits per second).

The complete sequence comprising a sample representative of each of the virtual channels comprises a complete synchronous data-processing cycle (or SDPC). The duration of an SDPC is equal to 125 µs in the case of an 8 kHz frequency of sampling the virtual channels. The full sequence is represented by the succession 102 of virtual channels for which the duration of the SDPC cycle (represented by the signal 100) also called an SDPC period is contained between two pulses 101 separated by 125 µs.

Thus, the useful bit rate of the transmission channel (in the example an audio channel) is equal to 9.216 Mbps (megabits per second) for the transfer of the audio information.

To avert the need for having to manage a header describing the rate of use of a virtual channel and thus save on bandwidth, it is assumed here below in the description that a reserved virtual channel is transmitted on the network only in a full or empty state.

During an SDPC cycle, when the data made available by a generator application forms a half-filled virtual channel, the available pieces of data are stored in a memory (which then contains the residue), and the virtual channel is transmitted as being empty (i.e. with a piece of information stating that the virtual channel does not contain any payload data). During the next SDPC cycle, new pieces of available data are added to the data previously stored in the memory (residue) to fill the virtual channels as efficiently as possible.

Referring now to FIG. 1B, a drawing is presented illustrating a complete synchronous data transmission cycle or SDTC according to the particular embodiment of the invention.

A container associated with a given virtual channel, also called a VC Chunk ("Virtual Channel Chunk") container, comprises all the samples of this given virtual channel transmitted on a predefined set of SDPC cycles. The building of a given VC Chunk container is done during a complete synchronous data transmission cycle or SDTC and the transmission of the VC Chunk container considered, for its part, is done during the SDTC.

As a consequence, the duration of an SDTC (represented by the signal 110) is a multiple of the duration of an SDPC.

The term "STPR" (or synchronous transmission to processing ratio) refers to the ratio of the synchronous data transmission cycle (SDTC) to the synchronous data-processing cycle (SDPC).

The STPR thus defines the size of the container associated with a virtual channel independently of the number of virtual channels.

According to the particular embodiment of the invention, the STPR is equal to 16. Thus, a container associated with a virtual channel (VC Chunk) is constituted by 96 bytes corresponding to the size of the sample (i.e. 48 bits) multiplied by the value of the STPR (herein equal to 16).

During an SDTC, each node (WAP or WAR) can send a radio packet 112.

According to the particular embodiment of the invention, during an SDTC, ten radio packets of identical duration are transmitted on the network in a predefined transmission sequence. Thus, the first two radio packets of the SDTC are transmitted by the WAP node, and the next eight radio packets are transmitted by each of the WAR nodes, thus enabling the exchange of data contents within the communications network, the WAP node being considered in this case as being the node most acted upon in transmission (multimedia data server node for example). Any other distribution of radio packets during an SDTC is possible depending on the application aimed at.

Each radio packet is at a distance from the previous packet by a time period known as an inter-packet time 113.

It is furthermore considered that a synchronous data transmission cycle SDTC is equal to the sum of the duration of transmission of all the radio packets and of the inter-packet times, a sum to which the synchronization interval is added.

Advantageously, the dimensioning of the communications network is such that, at the end of transmission of the last radio packet (in the above-mention example, 10 radio packets are transmitted per SDTC), after a last inter-packet time, there remains a time slot called a synchronization interval 114 defined by the following formula:

$$\text{Synchronization interval} = \text{duration of the SDTC} - (10 \times (\text{duration of a radio packet} + \text{radio inter-packet time}))$$

The synchronization interval 114 enables the nodes of the network to synchronize the transmissions of radio packets on the SDTC cycle and absorb possible clock drifts for the nodes relative to one another to prevent the last node that transmits from doing so during the speech time of the first node of the next SDTC cycle.

Figure 2:
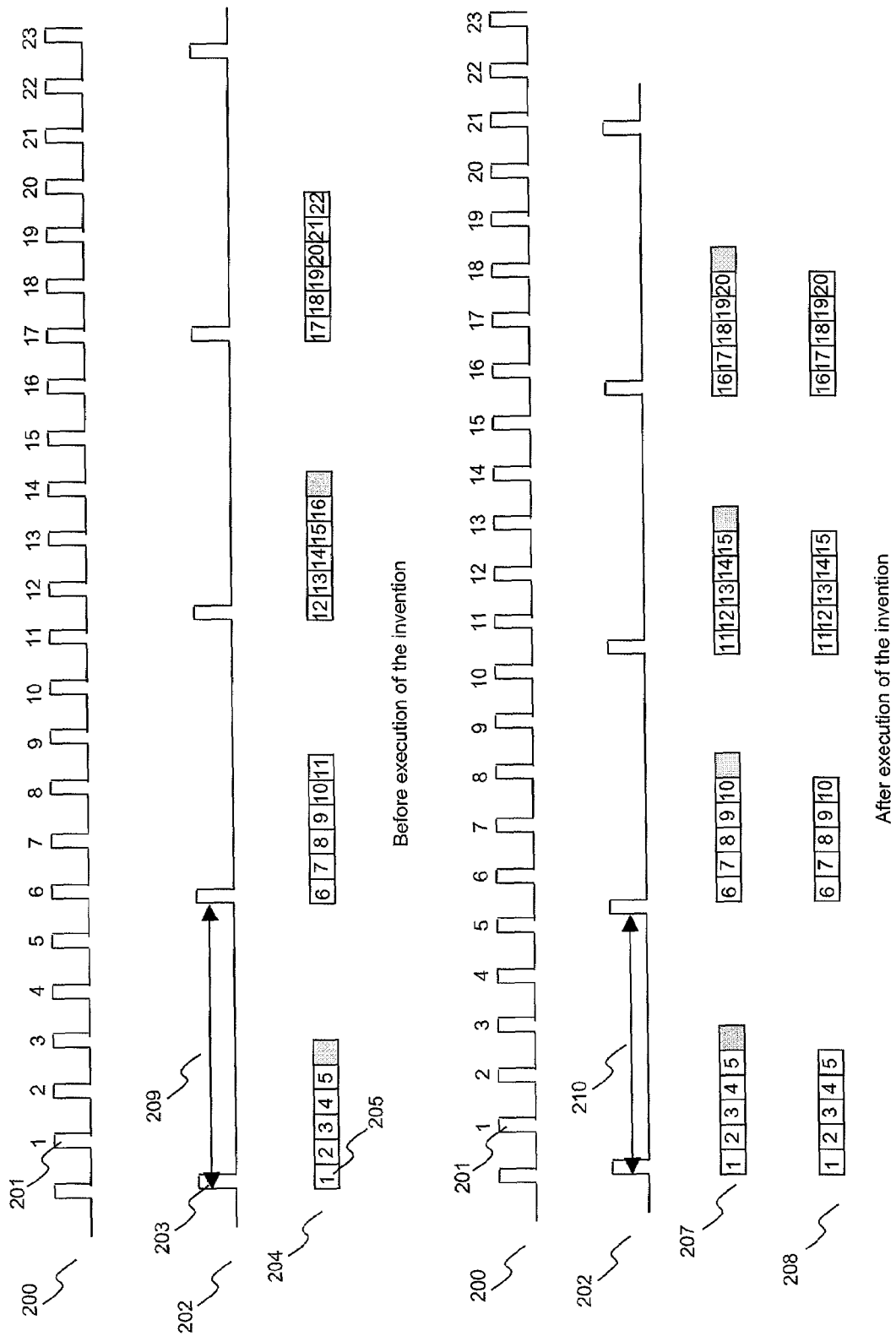
FIG. 2 illustrates an example of implementation of the invention according to the particular embodiment for the transmission of a given content.

Referring to FIG. 2, a description is provided of an example of implementation of the invention according to the particular embodiment of the transmission of a given content. This example is given by way of an illustration of the invention in the case of a filling of the last virtual channel at 50% (i.e. the virtual channel is filled in one of every two SDPC cycles).

The signal 200 represents the frequency at which the WAP node of the network receives samples coming from a multiple-channel audio decoder connected to the WAP node.

A pulse 201 of the signal 200 corresponds to the transmission of an audio sample of the content considered.

The signal 202 represents the clocking of the SDPC. The transmission of a pulse 203 of the signal 202 indicates the start of an SDPC.

The row 204 represents the virtual channels (a virtual channel being represented by a box 205) reserved for a given application. In the example of an implementation of the invention illustrated in FIG. 2, the number of virtual channels reserved for a generator application considered is equal to six.

For each SDPC cycle (whose start is marked by the transmission of a pulse 203), the WAP node receives the data of the generator application received at regular intervals; it then uses these pieces of data to fill the virtual channels reserved for the generator application considered, and does so as a function of the number of pieces of data received between two pulses 203.

The upper part of FIG. 2 illustrates the state of the signals in the communications network before the execution of the invention. The SDPC has a duration referenced 209. The last virtual channel reserved is then empty at one in every two SDPC cycles. This proves to be not optimal in terms of use of reserved bandwidth.

The lower part of FIG. 2 repeats the same signals as those of the upper part but shows them after the execution of the invention according to the particular embodiment. The SDPC cycle, modified in accordance with the method of the invention, has a new duration referenced 210.

It can be seen, in analyzing the row 207, that the last reserved virtual channel is now always empty.

Advantageously, as shown in the row 208, the last virtual channel, which is always empty, can be released in order to optimize the use of the bandwidth.

Thus, the general principle of the invention consists in modifying the SDPC and thus in also modifying the SDTC cycle (the duration of an SDTC was equal to the duration of an SDPC cycle multiplied by the STPR ratio), in order to achieve a more efficient use of the bandwidth as described in greater detail here below in the description.

The example, illustrated in FIG. 2, describes solely the case where the SDPC is decreased, thus leading to the release of a virtual channel. Here below in the description, the case in which the SDPC is increased is no longer described in full detail. This corresponds to the disappearance of generator applications communicating on the communications network (the data coming from these generator applications no longer being sent out on the communications network). This reduces the working/transmission frequency of the communications network while at the same time optimizing the use of the resources by the remaining generator applications.

Referring to FIG. 3A, we present the main steps of an algorithm for managing the bandwidth implemented within the management device according to the particular embodiment of the invention.

Thus, in a step 310, a set of virtual channels to transmit the data of the given generator application according to the first clocking is determined.

In a step 311, a rate of use of the last virtual channel, referenced RU, is determined.

In a step 320, the current data-processing frequency $F_{SDPC}$ (defining the SDPC cycle) is adjusted according to the rate of use of the last virtual channel determined in the step 311, thus giving an adjusted data-processing frequency $F_{new}$ (defining a new duration for the SDPC cycle).

Then, in a step 330, a final allocation is made of an integer number of allocated virtual channels ($VC_{new-allocated}$) to the generator application considered as a function of the rate of use of the last virtual channel.

This final allocation may be:
the allocation of an integer number of allocated virtual channels ($VC_{new-allocated}$) to the generator application considered, in case the determining of the rate of use of the last virtual channel is done on the basis of theoretical data (frequencies, precision etc) related to the communications network and the application (or applications) considered;
the release of a virtual channel, in case the determining of the rate of use of the last virtual channel is done on the basis of theoretical data (frequencies, precision etc) related to the communications network and on the application (or applications) considered after a first set of virtual channels has been allocated to the application (or applications) considered;
the release of a virtual channel, in case the determining of the rate of use of the last virtual channel is done by monitoring of the filling of this virtual channel (the term used is then "real rate of use").

The above-mentioned steps of the management algorithm are described in greater detail here below with reference to FIG. 3B.

A description shall henceforth be given, with reference to FIG. 3B, of the steps of the above-mentioned bandwidth management algorithm according to the particular embodiment of the invention.

Prior to the step for determining a set of virtual channels (step 310), a new generator application connected to the communications network is discovered in a step 300.

The discovery of an application can be done on an a priori basis. In this case, the node of the network to which the application is connected (or at which it is present) knows the characteristics of this application in advance. This is the case for example of the WAP node to which the multiple-channel audio decoder is connected. In the case of an a priori discovery, the node has advance knowledge of the characteristics of the application (for example the frequency of the application, the precision etc).

The discovery of an application can also be done according to a "hot plug" application. In this case, the characteristics of the application are not known until the time when it is connected to the node of the network, by the implementation of a protocol (for example the UPnP protocol) by it to be presented to the node. The node may also obtain information (for example by the frequencies of the application, the precision etc) which it will subsequently need.

The step 310 is a step for the determining, depending on the characteristics of the application (sampling frequency, precision etc) and the characteristics of the node (operating frequency, precision etc), of the number of theoretical virtual channels referenced $VC_{theoretical}$ necessary for the generator application considered to transmit its data.

The knowledge of the SDPC frequency and precision is obtained on an a priori basis, the communications network knowing its characteristics by construction. When the communications network is powered on, the value of the SDPC frequency is initialized at its default value (i.e. 8 kHz in the present example). The value of the SDPC frequency can evolve during the execution of the bandwidth management method. Such an evolution remains however unknown to the bandwidth management device.

More specifically, the SDPC cycle having a period equal to 125 µs is generated by a generation device, for example of the quartz type, possessing its own nominal frequency (greater than the SDPC frequency) and is characterized by a certain precise value Y on the nominal frequency (generally expressed in parts per million or ppm). The real frequency of the component can then be expressed according to the following formula: $F_{real}=F_{nominal}\pm Y$ ppm.

The generation of the SDPC cycle signal is done by division of the frequency of the quartz crystal. Thus, after the generation of a first pulse $Cycle_{SDPC}$, it is possible to count a known number of cycles at the frequency of the quartz crystal (one number of clock strokes also called "ticks") before generating the following pulse $Cycle_{SDPC}$ which marks the start of a new SDPC.

Similarly, the sampling frequency of the connected application is generated by a generation device, for example of the quartz crystal type, which for its part also has its own precision. The mechanisms of the generation of this signal are the same as those described here above.

The knowledge of the frequency of the generator application and of its precision can be obtained in several ways:
the node has a priori knowledge of the values of the frequency and of the precision of the application considered;
the node receives a notification from the application with the values of the frequency and of the precision of the application considered;
the node receives a query for a bandwidth request from the application. It can then deduce the frequency of the application therefrom. Then, relating to the precision, a predetermined default value can be applied;
the node, over a certain period of time, measures the interval in terms of the number of clock strokes between two samples of the application in order to deduce the frequency of the application therefrom. With respect to the precision, it is also possible to apply a default value.

Since the real processing frequency is liable to be different from the nominal frequency or liable to change in the course of the use of the devices (for example with a drift of the frequency related to temperature changes), it is preferable to envisage the extreme cases to compute the theoretical number of virtual channels necessary for implementing an application on the communications network.

Thus, the theoretical number of virtual channels, also referenced $VC_{theoretical}$, may be determined (step 310) according to the following formula (taking for example the case where the generator application considered generates 24-bit samples and where a virtual channel may contain 48 bits):

$$VC_{Theoretical} = \frac{(F_{Appli} + Xppm) * 24}{(F_{SDPC} - Yppm) * 48}$$

where $F_{appli}$ represents the nominal frequency of the application;
Xppm represents the precise value of the application frequency;
$F_{SDPC}$ represents the nominal frequency of the SDPC cycle;
Yppm represents the precise value of the SDPC frequency.

The number $VC_{Theoretical}$ then represents the maximum theoretical number of virtual channels that a generator application will have need of should the frequency of this application have drifted until it is the fastest possible (the samples reach more rapidly) while the SDPC frequency has drifted until it is the slowest possible (the SDP see cycle is longer).

The step 311 for determining the rate of use of the last virtual channel comprises the sets 312 and 315 described here below.

Optionally, in a step 312, a maximum number of virtual channels $VC_{Max}$ is determined. This maximum number of virtual channels depends on the characteristics of the communications network. The previous determining of the number $VC_{Theoretical}$ could as the case may be give a non-integer number of virtual channels. Now, the management device can allocate only an integer number of virtual channels. It is then appropriate to determine the maximum number of virtual channels, referenced $VC_{Max}$, as a function of the number $VC_{Theoretical}$ computed.

The following algorithm can be used to determine the maximum number of virtual channels to be reserved:

If $VC_{Theoretical}$-INT($VC_{Theoretical}$)=0;

then $VC_{Max}=VC_{Theoretical}$ else $VC_{Max}$=INT($VC_{Theoretical}$)+1

Then, in an optional step 313, the current integer number of virtual channels, referenced $VC_{current-allocated}$ is reserved. It is possible for example to take a number $VC_{current-allocated}$ equal to the maximum number of virtual channels $VC_{Max}$ determined during the step 312, i.e. $VC_{current-allocated}=VC_{Max}$. The reservation is done by the resource manager of the node consider (in the present example the WAP node), the resource manager being possibly a module included in each of the nodes of the network. The resource manager knows the virtual channels currently free during an SDPC cycle and can therefore reserve the quantity of resources necessary.

The resource manager of the node considered then informs the resource managers of the other nodes (for example by means of a protocol which travels in a virtual channel allocated to the exchange of control messages between the nodes of the network) of the reservation so that each node knows the virtual channels reserved by such and such an application and the virtual channels available.

Depending on the preceding computations ($VC_{Theoretical}$, $VC_{Max}$) the last reserved virtual channel is full only from time to time.

For example, for an audio application having a resolution 48 kHz-24 bits at 1000 ppm and a transmission channel associated with the network having a resolution 8 Hz-48 bits at 100 ppm, we obtain, by means of the previously established formulae, the following theoretical and maximum numbers of virtual channels: $VC_{Theoretical}$=3.0033 $VC_{Max}$=4.

In this case, the fourth virtual channel is completely filled only every 300 SDPC cycles.

The optional reservation (step 313) of the virtual channels without optimizing their use enables the communications network to function rapidly, especially when several concurrent applications are connected to the network.

It is indeed possible to envisage a case where so long as the system is not in a critical situation in terms of number of available resources, the optimization of the use of virtual channels is not necessary. During the connection of a new application and if the reservation of virtual channels proves to be impossible, the optimization of the resources can be implemented.

Thus, optionally, in a step 314, a request for optimization is received. The optimization request can take place for example when the level of free resources reaches a critical threshold or when an attempt to reserve virtual channels has failed.

In a step 315, a theoretical rate of use of the last virtual channel associated with the generator application considered is determined on the basis of the determined theoretical number of virtual channels $VC_{Theoretical}$.

The step 320 of adjustment of the SDPC comprises the steps 321 to 325 described in detail here below.

In a step 321, it is verified that the theoretical rate of use is greater than a determined threshold, referenced S1. The threshold S1 is described in detail here below with reference to FIG. 4.

FIG. 4 show a table grouping together a set of rates of use of the last virtual channel allocated to a generator application according to the particular embodiment of the invention.

The column 400 of the table represents the decimal part of $VC_{Theoretical}$, i.e. the theoretical rate of use of the last virtual channel. The column 401 indicates the proportion of SPDC cycles in which the last virtual channel is used (filled).

The table, consisting of the columns 400 and 401 has been divided into two distinct zones:

a zone 402: in this zone 402, it is estimated that the rate of use of the last virtual channel reserved is optimal. Consequently, no modification of the SDPC frequency is necessary;

a zone 403: in this zone 403, the rate of use of the last reserved virtual channel is considered to be non-optimal. A modification of the SDPC frequency is therefore necessary.

A threshold S1 of separation of the zones 402 and 403 10 can be defined as a function of the characteristics of the network (for example as a function of the total number of virtual channels during an SDPC cycle and of the total number of virtual channels reserved for the applications). This separation threshold S1 can be fixed definitively or it can evolve in time according to the availability of the resources. For example S1=0.15.

If it has been determined that it is necessary to perform a modification (an optimization so that the last virtual channel is no longer used and so that it can be released) of the management of the bandwidth, a new optimal number of virtual channels referenced $VC_{opt}$, is determined in order to obtain a rate of use of the last optimal virtual channel. In the case of a very low initial rate of use of the last virtual channel (for example $VC_{Theoretical}$=3.0033), the number $VC_{opt}$ is chosen to be slightly smaller than the integer part of $VC_{Theoretical}$ so as to therefore return to the zone 402 where no optimization is necessary. For example, should $VC_{Theoretical}$=3.0033, it is possible to choose $VC_{opt}$=2.999.

In the event of a positive verification at the step 321 (the theoretical rate of use is higher than the threshold S1), the optimal decimal number $VC_{opt}$ is taken to be equal to the theoretical decimal number $VC_{Theoretical}$ of virtual channels in the step 322. We therefore have $VC_{opt}=VC_{Theoretical}$. There will therefore be no frequency adaptation in this case.

In the event of negative verification at the step 321 (the theoretical rate of use is lower than the first threshold) the optimal decimal number of virtual channels $VC_{opt}$ is taken, in a step 323, such that: $E(VC_{Theoretical})-1+S1<VC_{opt} \leq E(VC_{Theoretical})$.

Thus, when the optimal decimal number of virtual channels $VC_{opt}$ has been determined (step 320 or step 322), then, in a step 324, the processing frequency SDPC adjusted as a function of the optimal decimal number of virtual channels $VC_{opt}$ is determined by applying the following formula to determine the minimum value of the adjusted SDPC frequency:

$$F_{NewMin} = \frac{(F_{Appli} + Xppm) \times 24}{VC_{opt} \times 48}$$

where
$F_{Appli}$ represents the nominal frequency of the application;
Xppm represents the precise value of the frequency of the application;
$VC_{opt}$ represents the optimum number of virtual channels for the application.

The value $F_{NewMin}$ corresponds to the minimum value of the optimal SDPC adjusted frequency from which the precise value Yppm (where Y is the position of the crystal oscillator used to generate the signal) has been subtracted.

To obtain the SDPC adjusted frequency, the following formula is applied:

$$F_{New} = F_{NewMin} + Yppm$$

From this, it is then possible to deduce the new number of clock ticks necessary for the SDPC generation device (also called the generation module).

The new value of the SDPC frequency $F_{New}$ becomes the new reference here below in the description.

The step 324 is used to determine the adjusted SDPC processing frequency as a function of the optimal decimal number $VC_{opt}$ of virtual channels.

Thus, depending on the theoretical rate of use of the last virtual channel, the adjusted SDPC processing frequency becomes:

the rate of use is very low ($VC_{opt}$ then verifies: $E(VC_{theoretical})-1+S1<VC_{opt} \leq E(VC_{theoretical})$). In this case, the SDPC frequency is modified so that the last virtual channel no longer has to be used, and this results in an increase in the SDPC frequency:

the rate of use is optimal (we then have $VC_{opt}=VC_{theoretical}$). In this case, the SDPC frequency is not modified.

In a step 325, the SDPC adjusted processing frequency is then applied to the communications network.

The new value of the number of clock ticks is then provided to the SDPC generation device.

The management device can then implement either one of the following two methods for modifying the SDPC cycle (in the same process the SDTC):

a first method which consists in applying the modification of the SDPC cycle in a single operation: for example the next SDPC cycle is then modified in accordance with the new value of the SDPC frequency. Such a method has the advantage of being very fast in the case of a major modification but may however give rise to a temporary loss of synchronism between the nodes of the network due to the time taken by the nodes to adapt to the new value of the SDPC cycle. A loss of data may then be prompted, causing a break in service;

a second method which consists in analyzing the difference is to be applied between the current SDPC cycle and the new SDPC cycle to choose to integrate the modification, for example over several cycles. Such a method is lengthier in the optimizing of resources but has the advantage of not causing losses of synchronization between the nodes of the network and, consequently, not causing any data loss.

When the SDPC frequency has been adjusted, the SDPC generation device can then (for example using a common register, or by generating an interruption etc) inform the management device that the SDPC cycle has been updated in accordance with the new value of the SDPC frequency.

In the particular embodiment of the invention, certain constraints are taken into account when determining the adjusted frequency $F_{New}$, especially constraints related to the communications network.

Thus, should the frequency SDPC be increased, the synchronization interval 114 is taken into account. Indeed, as described here above, the synchronization interval depends on the duration of the SDPC cycle and therefore the SDPC frequency. When the SDPC cycle becomes too small (the SDPC frequency rises), the synchronization interval 114 may disappear. Indeed, if the SDPC frequency rises, the SDPC period diminishes and therefore so does SDTC period. Since the time of transmission of a radio packet as well as the inter-packet time are both constants, it is the synchronization interval that will diminish, to the extent of even disappearing, and this must be avoided. In this case, the first node to send a radio packet sends its data at the end of speech time of the last node to be transmitted.

To avoid an excessively small synchronization interval, it is possible to implement an algorithm (described further below with reference to FIG. 5) to determine a number $VC_{opt}$ such that the computation of the SDPC adjusted frequency enables the synchronization interval to be greater than a minimum value (which may be characteristic of the network).

The step 330 of final allocation of an integer number of virtual channels $VC_{new-allocated}$ to the generator application considered includes the steps 331 and 332 described in detail here below.

In a step 331, a number of allocated virtual channels $VC_{new-allocated}$ is determined as a function of said optimal decimal number ($VC_{opt}$) of virtual channels such that:
if $VC_{opt}-E(VC_{opt})=0$ then $VC_{new-allocated}=VC_{opt}$ with $E(\ )$ being the "integer part" function;
if not $VC_{new-allocated}=E(VC_{opt})+1$.

Thus, should the steps 312 and 313 have been implemented (a current integer number $VC_{new-allocated}$ of virtual channels has already been allocated to the generator application, for example $VC_{Max}$), and if the integer number of allocated virtual channels $VC_{new-allocated}$ is smaller than said current integer number $VC_{current-allocated}$, then a release of the last virtual channel is done in a step 332.

The release (step 332) can be done according to the following two methods:

a first method of release may consist in releasing the unused resources once the new SDPC cycle has been set up;

a second method of releasing resources that is more advantageous but is lengthier may consist in monitoring the use of the last virtual channel. Thus when, during a predetermined time, the last virtual channel is effectively no longer in use (i.e. when the rate of use of the last virtual channel is zero) it may be released.

Should it be the case that a current integer number ($VC_{current-allocated}$) has not already been allocated to the generator application (the steps 312 and 313 have not been implemented), then a first allocation of the integer number of allocated virtual channels (VC$_{new-allocated}$) allocated to the generator application considered is done in a step 332.

In the multi-applications case, the use of the bandwidth is optimized for example for the generator application that possesses a rate of use of its last virtual channel that is the least optimal rate.

The use of the bandwidth can also be optimized whenever a new generator application is declared in the communications network.

The theoretical rates of use of the last virtual channel of each of the generator applications are therefore compared and finally it is only the lowest (i.e. the least optimal) rate of use of the last virtual channel that is chosen. The remainder of the bandwidth management procedure is identical to the one described here above in the case of only one generator application.

However, the multi-applications case adds additional constraints. It is preferable indeed to make sure that the optimization of a generator application does not degrade the rate of use of the last virtual channel of another application.

After an adjusted SDPC frequency has been determined, the effect of the modification of the SDPC frequency on the other applications is analyzed by computing a VC$_{Theoretical}$ value for each of them in order to ascertain that no other application has its performance degraded (rate of use of the last virtual channel passing from the optimum zone 402 to the non-optimum zone 403 of the table of FIG. 4).

If necessary, depending on the result of the two checks mentioned here above, at least one of the following operations is performed:

searching for a new value of VC$_{opt}$ associated with the application considered so as to no longer degrade the other applications while at the same time preserving optimization for the application considered;

attempting to optimize the degraded application or applications by a first execution of the bandwidth management method according to the particular embodiment of the invention within the limits of the possibilities of the network.

Furthermore, the slave nodes of the network adapt their SDPC cycle to that of the master node. For example, the master node sends a control message (information on the adjusted processing frequency) to the slave nodes. The message would contain the difference to be applied to the number of clock strokes used to generate the adjusted SDPC frequency. Another example would be the use by the slave nodes of a PLL locked to the SDTC signal. This signal is derived from the SDPC cycle of the master node. The slave nodes will therefore modify their old SDPC cycle according to the indications of the PLL locked 2-D SDTC of the master node.

FIG. 5 presents the main steps of an algorithm determining the value of a synchronization interval in the embodiment according to the invention.

A step 500 (grouping together a part of the steps implemented during the performance of the adjustment step 320) is used to determine a first value of a number VC$_{opt}$ in compliance with what was described here above with reference to FIGS. 3A, 3B and 4.

Then, in a step 501, the adjusted SDPC frequency F$_{new}$ is determined.

In a step 502, the value of the synchronization interval is determined such as it would be if the adjusted frequency F$_{new}$ were to be taken into account, according to the formula (in the case of the cycle comprising 10 fixed-size radio packets):

Synchronization interval=duration of the SDTC cycle−(10×(duration of a radio packet+time between radio packets)).

with duration of the SDTC cycle=duration of the SDPC*STPR.

Then, in a step 503, a check is made to ascertain that the value of the synchronization interval thus determined is greater than a minimum value (characteristic of the network).

If the verification at the step 503 is positive (the value of the synchronization interval is greater than a minimum value), then the algorithm is stopped in a step 504.

If the verification of the step 503 is negative (the value of the synchronization interval is smaller than a minimum value), then the algorithm returns to the step 500 to determine a new value of the number VC$_{opt}$.

Referring to FIG. 6, a description is now provided of the main steps of a control algorithm (also called a monitoring algorithm) for monitoring the rate of use of the last reserved virtual channel according to a variant of the particular embodiment according to the invention.

In order to activate the optimizing of the use of the bandwidth, a check may be made on the rate of use of the last virtual channel of each application connected to the network.

When the communications network is initialized and for each application connected to the network, the control algorithm starts in a step 600.

A step 601 consists in waiting for a first "last virtual channel filled" event, generated for example in the form of an interruption by the module in charge of filling the virtual channels with the data coming from the application, to start the control of the rate of use of the last virtual channel.

In a step 602, a variable Period is initialized at zero (Period=0). The variable Period represents the number of SDPC cycles between two complete instances of filling the last virtual channel.

In a step 603, a first SDPC cycle is awaited in order to start on an integer number of SDPC cycles. The wait is stopped upon reception of the SDPC signal 101 as described with reference to FIG. 1A.

In a step 604, the elapsing of an additional SDPC cycle is awaited.

In a step 605, when the wait is terminated, a check is made to ascertain that, in the elapse cycle, the "last virtual channel filled" event has occurred.

In the event of negative verification of the step 605 (the "last virtual channel filled" event has not occurred), the variable Period is incremented by 1 in a step 606, and the algorithm returns to the step 604 to analyze the next SDPC cycle.

In the event of positive verification at the step 605 (the "last virtual channel filled" event has occurred), the value of the variable Period is stored in a "rate of use" variable. It is possible thereafter to study all the "rate of use" variables to determine the applications to be optimized. It must be noted that this variable corresponds to the figures found in the column 401 of the table described with reference to FIG. 4.

This variant of the particular embodiment of the invention has the advantage of providing real-time monitoring of the use of the bandwidth based on the real frequencies (i.e. frequencies that have potentially already undergone a variation) of the oscillators. There will therefore be a result of that is more precise then in the case of a computation taking account of the theoretical values. It also enables a verification that an optimization is truly necessary. Indeed, this control is performed on the basis of the effective frequencies of both the application and the SDPC cycle. Consequently, the frequencies may drift so as to optimize a use of the bandwidth that was theoretically not optimal. It is also possible to see the system as being optimal whereas computation would have indicated that it "had to be optimized".

FIG. 7 shows the generic architecture of a communications node of the communications network implementing the bandwidth management method according to the particular embodiment of the invention.

Each communications node 700 can get connected to a generator application using an applications clock signal Sclk_in 705 and an applications data signal Data_in 706 (in the case of a WAP node).

The transfer module 701 is in charge of:
retrieving the data coming from the generator application;
storing the data coming from the generator application in a buffer memory;
placing the data coming from the generator application at the disposal (for reading) of a device 702 for management of the SDPC transfer mode;
computing and inserting synchronization data on the application of the bandwidth management method of the invention.

The exchange of applications data between the transfer module 701 and the management device 702 is done by means of first interface signals Data_tx_VC 710, Rd_clk 711 and Empty 709.

The exchange of applications data between the transfer module 701 and the management module 702 is done by means of second interface signals 712.

Each communications node 700 can also get connected to a destination application, by means of an applications clock signal Sclk_out 707 and an applications data signal Data_out 708 (in the case of a WAR node).

The retrieval module 704 is in charge of retrieving the content of the virtual channels coming from the management device 702 and of storing it in a buffer memory for transmission to the destination application at the rate of Sclk_out.

The exchange of applications data between the management device 702 and the retrieval module 704 is done by means of third interface signals Data_rx_VC 715 and Wr_clk 716.

The exchange of synchronization data between the management device 702 and the retrieval module 704 is done by means of fourth interface signals 717.

The management device 702 is entrusted, at each SDPC cycle 718, with retrieving the content of the source and synchronization applications data to format the allocated virtual channels in transmission, coming from the transfer module 701, and transfer this information to the transmission module 703. The exchange of data between the management device 702 and the transmission module 703 is done by means of interface signals Data_tx 725 and Ctrl_data_tx 721 in the direction of a transmission to the network.

The management device 702 is responsible for retrieving the information coming from the transmission module 703 and, at each SDPC cycle 718, of providing the content of the allocated virtual channels in reception to the retrieval module 704.

The exchange of data between the transmission module 703 and the management device 702 is done by means of interface signals Data_rx 722 and Ctrl_data_rx 723 in the direction of reception from the network.

The management device 702 is also in charge of generating signals for synchronizing the system (especially the SDPC cycle signal 718) as well as for filling of the allocated virtual channels in transmission with the applications data coming from the module 701.

Thus, the algorithms described here above are implemented in the management device 702. This may be a module implanted in a programmable component (for example an FPGA or field programmable gate array). The management device interacts with the synchronization signal generation module to modify the SDPC cycle. It also interacts with the management device of the application in order to obtain the data needed to determine an optimum SDPC cycle. It can also interact with the module for filling the virtual channels in the context of the variant described here above in order to carry out a control on the rate of use of the last reserved virtual channel.

Furthermore, the transmission module 703 implements a synchronous transmission mode and uses a transmission/reception antenna 724.

The invention claimed is:

1. A method for managing bandwidth in a synchronous communications network comprising a plurality of nodes, said network implementing a first clocking which defines a data-processing cycle comprising a determined number of virtual channels corresponding to time slots, said data-processing cycle being defined by a current data-processing frequency, said plurality of nodes comprising at least one transmitter node associated with at least one generator application generating data that has to be transmitted to at least one destination node, each generator application being associated with at least one virtual channel for transmitting its data, said method comprising the following steps, performed for a given generator application:
a) determining a set of virtual channels, within said data-processing cycle, for transmitting the data of the given generator application according to the first clocking defined by the current data-processing frequency, the set of virtual channels determined being filled one by one from a first to a last virtual channel;
b) determining a rate of use of the last virtual channel of the set of virtual channels determined for transmitting the data of said generator application;
c) adjusting said current data-processing frequency, as a function of said rate of use of said last virtual channel, enabling an adjusted data processing frequency to be obtained; and
d) allocating an integer number of virtual channels for transmitting the data of said generator application, as a function of said rate of use of said last virtual channel.

2. The method according to claim 1, wherein the step c) of adjusting said current data-processing frequency comprises the following steps:
c1) determining an optimal decimal number of virtual channels as a function of said rate of use of the last virtual channel;
c2) determining said adjusted data-processing frequency, as a function of said optimal decimal number of virtual channels; and
c3) applying said adjusted data-processing frequency,
wherein the step d) of allocating an integer number of virtual channels comprises a step of determining said integer number of virtual channels, as a function of said optimal decimal number of virtual channels.

3. The method according to claim 2, wherein
if a current integer number of virtual channels has not been allocated for transmitting the data of said generator application, then said integer number of virtual channels is allocated to transmission of the data of said given generator application, and
if a current integer number of virtual channels has already been allocated for transmitting the data of said generator application, then one of said allocated virtual channels is released for transmitting the data of said generator application.

4. The method according to claim 1, wherein said last virtual channel of the set of determined virtual channels for transmitting the data of said generator application according to the first clocking is excluded from the virtual channels allocated for transmitting the data of said generator application in the step d) of allocating an integer number of virtual channels for transmitting the data of said generator application, as a function of said rate of use of said last virtual channel.

5. The method according to claim 1, wherein said step a) of determining a set of virtual channels for transmitting the data of the generator application comprises the following step:
   determining a theoretical decimal number of virtual channels as a function of:
   said current data-processing frequency;
   a precise value of the current data-processing frequency;
   a size of each of said virtual channels;
   a frequency at which said generator application generates data samples;
   a precise value of the frequency at which said generator application generates data samples; and
   a size of said data samples.

6. The method according to claim 5, wherein said step of determining a rate of use of the last virtual channel for said generator application comprises:
   determining said rate of use of the last virtual channel, as a function of said theoretical decimal number of virtual channels, said rate of use being a theoretical rate of use.

7. The method according to claim 6, wherein said step of determining an optimal decimal number of virtual channels comprises:
   comparing said theoretical rate of use with a predetermined threshold,
   wherein if said theoretical rate of use is greater than said threshold, said optimal decimal number of virtual channels is taken to be equal to said theoretical decimal number of virtual channels, and
   wherein if said theoretical rate of use is lower than or equal to said threshold, said optimal decimal number of virtual channels is taken to be smaller than or equal to the integer part of said theoretical decimal number of virtual channels.

8. The method according to claim 7, wherein, if said theoretical rate of use is lower than or equal to said threshold, said optimal decimal number of virtual channels is further taken to be greater than the integer part of said theoretical decimal number of virtual channels decreased by one unit and increased by said threshold.

9. The method according to claim 1, wherein with a current integer number of virtual channels being already allocated for transmitting the data of said generator application, said step of determining a rate of use of the last virtual channel for said generator application comprises a step of measuring a real rate of use of said last virtual channel of the set of determined virtual channels for transmitting the data of said generator application.

10. The method according to claim 9, wherein said step of determining an optimal decimal number of virtual channels comprises:
    comparing said real rate of use with a determined threshold,
    wherein if said real rate of use is lower than or equal to said threshold, said decimal optimal number of virtual channels is taken to be smaller than or equal to the current integer number of virtual channels already allocated to said generator application decreased by one unit.

11. The method according to claim 10, wherein if said real rate of use is lower than or equal to said threshold, said optimal decimal number of virtual channels is taken to be greater than the current integer number of virtual channels already allocated for transmitting the data of said generator application, decreased by two units and increased by said threshold.

12. The method according to claim 9, wherein, when said step of adjusting said current data-processing frequency has been done during a current data processing cycle, said allocating step is implemented when the rate of use of said last virtual channel is null during a predetermined time period after an adjusted data-processing frequency has been obtained.

13. The method according to claim 2, said network implementing a second clocking which defines a data-transmission cycle corresponding to an integer number of data-processing cycles, a data-transmission cycle comprising a synchronization interval between the last transmission of data in said data-transmission cycle and the end of said data-transmission cycle, wherein the method further comprises the following steps:
    c2') determining a new value of said synchronization interval, in taking account of said adjusted data-processing frequency;
    c2") comparing said new value of said synchronization interval with a determined minimum value,
    wherein if said new value of said synchronization interval is greater than or equal to said determined minimum value, then the operation passes to the said step c3), and
    if not, the operation returns to the step c1) in order to determine a new optimal decimal number greater than the preceding optimal decimal number.

14. The method according to claim 1, wherein, if at least two generator applications are present in the communications network, said step b) of determining a rate of use of the last virtual channel is performed for each generator application,
    and wherein said method comprises a step of selecting the generator application having the lowest rate of use of the last virtual channel,
    and wherein said steps c) of adjusting said current data-processing frequency and d) of allocating an integer number of virtual channels for transmitting the data of said generator application, are performed for the selected generator application.

15. The method according to claim 14, comprising:
    analyzing the impact of said adjusted data-processing frequency on the rate of use of the last virtual channel for each of the generator applications other than the selected generator application;
    in the event of detecting a degradation of the rate of use of the last virtual channel for at least one of the other generator applications, called at least one degraded application:
    at least one part of said steps c) and d) is reiterated for the selected generator application; and/or
    at least one part of said steps c) and d) is reiterated for said degraded application or applications.

16. A non-transitory computer-readable storage medium storing a computer program, which computer program comprises a set of instruction sequences that, when executed by a computer, implement a method for managing bandwidth in a synchronous communications network comprising a plurality of nodes, said network implementing a first clocking which defines a data-processing cycle comprising a determined number of virtual channels corresponding to time slots, said data-processing cycle being defined by a current data-processing frequency, said plurality of nodes comprising at least one transmitter node associated with at least one generator application generating data that has to be transmitted to at least one destination node, each generator application being associated with at least one virtual channel for transmitting its data, said method comprising the following steps, performed for a given generator application:
- a) determining a set of virtual channels, within said data-processing cycle, for transmitting the data of the given generator application according to the first clocking defined by the current data-processing frequency, the set of virtual channels determined being filled one by one from a first to a last virtual channel;
- b) determining a rate of use of the last virtual channel of the set of virtual channels determined for transmitting the data of said generator application;
- c) adjusting said current data-processing frequency, as a function of said rate of use of said last virtual channel, enabling an adjusted data processing frequency to be obtained; and
- d) allocating an integer number of virtual channels for transmitting the data of said generator application, as a function of said rate of use of said last virtual channel.

17. A device for managing bandwidth in a synchronous communications network comprising a plurality of nodes, said network implementing a first clocking which defines a data-processing cycle comprising a determined number of virtual channels corresponding to time slots, said data-processing cycle being defined by a current data-processing frequency, said plurality of nodes comprising at least one transmitter node associated with at least one generator application generating data that has to be transmitted to at least one destination node, each generator application being associated with at least one virtual channel for transmitting its data, said device comprising, for a given generator application:
- e) a virtual channel determining unit constructed to determine a set of virtual channels, within said data-processing cycle, for transmitting the data of the given generator application according to the first clocking defined by the current data-processing frequency, the set of virtual channels determined being filled one by one from a first to a last virtual channel;
- f) a rate of use determining unit constructed to determine a rate of use of the last virtual channel of the set of virtual channels determined for transmitting the data of said generator application;
- g) an adjusting unit constructed to adjust said current data-processing frequency, as a function of said the rate of use of said last virtual channel, enabling an adjusted data-processing frequency to be obtained; and
- h) an allocation unit constructed to allocate an integer number of virtual channels to the transmission of the data of said generator application, as a function of said rate of use of said last virtual channel.

18. The device according to claim 17 wherein the adjusting unit g) constructed to adjust said current data-processing frequency comprises:
- g1) an optimizing unit constructed to determine an optimal decimal number of virtual channels as a function of said rate of use of the last virtual channel;
- g2) a determining unit constructed to determine said adjusted data-processing frequency, as a function of said optimal decimal number of virtual channels;
- g3) an application unit constructed to apply said adjusted data-processing frequency;

and wherein the allocation unit h) constructed to allocate an integer number of virtual channels comprises an allocation determining unit for determining said integer number of virtual channels, as a function of said optimal decimal number of virtual channels.

19. The device according to claim 18, comprising:
an integer number allocation unit constructed to allocate said integer number of virtual channels for transmitting the data of said given generator application if a current integer number of virtual channels has not already been allocated for transmitting the data of said generator application;
a releasing unit constructed to release one of said virtual channels allocated for transmitting the data of said generator application, said releasing unit being activated if a current integer number of virtual channels has already been allocated for transmitting the data of said generator application.

20. The device according to claim 17, wherein said last virtual channel of the set of determined virtual channels for transmitting the data of said generator application according to the first clocking is excluded from the virtual channels allocated for transmitting the data of said generator application by the allocation unit for allocating h).

* * * * *